United States Patent [19]
Noguchi

[11] Patent Number: 5,790,509
[45] Date of Patent: Aug. 4, 1998

[54] DRIVING MECHANISM FOR AN OPTICAL PICKUP FOR OPTICAL DISKS

[75] Inventor: Masaru Noguchi, Hukushima, Japan

[73] Assignee: Tam Co., Ltd., Tokyo, Japan

[21] Appl. No.: 687,325

[22] PCT Filed: Nov. 14, 1995

[86] PCT No.: PCT/JP95/02322

§ 371 Date: Aug. 6, 1996

§ 102(e) Date: Aug. 6, 1996

[87] PCT Pub. No.: WO96/18190

PCT Pub. Date: Jun. 13, 1996

[30] Foreign Application Priority Data

Dec. 8, 1994 [JP] Japan .................... 6-330488

[51] Int. Cl.$^6$ .................... G11B 17/30; G11B 5/55
[52] U.S. Cl. .................... 369/215; 360/106
[58] Field of Search .................... 369/215, 219, 369/220, 221, 244; 360/106

[56] References Cited

FOREIGN PATENT DOCUMENTS

| 57-12451 | 1/1982 | Japan | 369/215 |
| 63-52373 | 3/1988 | Japan | 369/215 |
| 1-30081 | 1/1989 | Japan | 369/215 |
| 5-33316 | 4/1993 | Japan | |

*Primary Examiner*—Allen Cao
*Attorney, Agent, or Firm*—Armstrong, Westerman, Hattori, McLeland & Naughton

[57] ABSTRACT

A driving mechanism for an optical pickup for optical disks which uses the 3-beam system for tracking error detection. The driving mechanism has a swing supporting point provided on a base, and a swing arm which pivots about the swing supporting point and fixedly holds an optical pickup. The swing arm has a flat portion provided near an end portion thereof. The flat portion contains the center axis of the swing arm. A correcting point is provide on the center axis of the swing arm. The driving mechanism further has a correcting mechanism for causing the correcting point to move along a circular arc having a radius smaller than the distance from the correcting point to the swing supporting point, and a swing arm driving mechanism for swingingly driving the swing arm. The driving mechanism is less costly and capable of driving the optical pickup at high speed and with high accuracy. In addition, degradation of the output signal can be prevented.

11 Claims, 6 Drawing Sheets

DRIVING MECHANISM FOR AN OPTICAL PICKUP FOR OPTICAL DISKS

BACKGROUND OF THE INVENTION

1. Field of the Invention

The present invention relates to a driving mechanism for moving an optical pickup along a recording surface of an optical disk such as a compact disk (hereinafter referred to as "CD") to reproduce or read data recorded on the optical disk.

2. Description of the Related Art

To reproduce music or data from a recording track recorded on an optical disk, e.g., a CD, a laser light beam must be applied to the center of the recording track. A common control method for maintaining a light beam at the center position of a recording track is a 3-beam system in which, as shown in FIG. 2, a recording track T0 is illuminated with 3 beams, i.e., a center beam B0 and side beams B1 and B2. The side beams B1 and B2 are used for detection of a tracking error. If the position of the recording track shifts from the center position T0 to a position T1 or T2 as shown by the dotted lines, the intensity of reflected light from the side beam B1 or B2 changes. Therefore, the intensity change is detected to control the beam application position.

An imaginary straight line connecting the centers of the three beams is inclined at 2 degrees with respect to the center line (tangent) of the recording track, that is, the reference line of the optical pickup. In the 3-beam system, the inclination angle must be maintained at a constant level in an allowable range at all times. In other words, it is necessary to make the reference line of the optical pickup coincident with the tangential direction of the recording track within an allowable range. Therefore, many of conventional 3-beam type optical pickup driving mechanisms have been arranged to cause the optical pickup to move rectilinearly on a linear guide. There has been another type of driving mechanism in which an optical pickup is pivotally moved by a swing arm (see Japanese Utility Model Application Public Disclosure (KOKAI) No. 5-33316).

Regarding the length of time required for an optical pickup to move from the innermost track to the outermost track on a CD, about 3 seconds has heretofore been adequate for conventional musical reproduction systems. However, CD-ROMs, which are used as external storage units for computers, are required to make high-speed access; even an access time of 0.3 second or less is needed for CD-ROMs. The demand for such high-speed access makes it necessary to increase the optical pickup driving speed. The driving mechanism that uses a linear guide requires to increase the output of a driving motor for causing the whole optical pickup to perform an accelerated motion. In addition, the linear guide must be produced with high precision over the entire stroke; this causes the cost to increase. Further, a signal output line which extends from the optical pickup to connect with a stationary-side member also needs to be sufficiently long to cover the entire stroke. Consequently, noise is likely to be induced in the output signal line, and the output waveform is adversely affected. In a quadruple-speed drive system in which data is read from a CD rotating at a quadruple speed, the frequency of the data output signal is also quadrupled. Accordingly, the adverse effect due to the length of the output signal line increases.

In contrast, a driving mechanism in which an optical pickup is fixed on one end of a pivoting arm and pivotally moved about a supporting point for the other end of the pivoting arm needs no linear guide and enables the production cost to be reduced. However, as shown in FIG. 3, the locus D of movement of the optical pickup is a circular arc centered at the supporting point 38, and it is impossible to make the direction of the reference line of the optical pickup coincident with the tangential direction of each particular recording track at all points on the locus. Therefore, this type of driving mechanism cannot employ the 3-beam system for tracking error detection. Accordingly, Japanese Utility Model Application Public Disclosure (KOKAI) No. 5-33316 proposes a driving mechanism in which the position of the supporting point is moved by a cam having a special configuration, thereby allowing the reference line direction of the optical pickup to coincide with the recording track tangential direction at all times. The driving mechanism suffers, however, from the disadvantage that the supporting point moving mechanism is complicated, along with some other problems.

Accordingly, it is an object of the present invention to provide a driving mechanism for an optical pickup for optical disks which is designed so that the 3-beam system can be adopted to detect a tracking error, and that no high-precision linear guide is needed, and the moment of inertia is reduced to enable the driving mechanism to be driven by even a driving motor of small output, thereby allowing the production cost to be reduced, and further that the length of the output signal line is shortened, thereby making it possible to prevent degradation of the output signal.

SUMMARY OF THE INVENTION

The present invention provides a driving mechanism for an optical pickup for optical disks, which has: a swing supporting point provided on a base; a swing arm which pivots about the swing supporting point and fixedly holds an optical pickup, the swing arm having a flat portion provided near an end portion thereof, the flat portion extending parallel to the center axis of the swing arm, the swing arm further having a correcting point provided at a predetermined position; a correcting mechanism for causing the correcting point to move along a circular arc having a radius smaller than the distance from the correcting point to the swing supporting point; and a swing arm driving mechanism for swingingly driving the swing arm. Because the optical pickup is driven by a swing motion about the swing supporting point, an energy loss due to friction or the like is small in comparison to the drive using a linear guide. In addition, no high-precision linear guide is needed, and thus the production cost reduces. The correcting mechanism enables the direction of the reference line of the optical pickup to coincide with the tangential direction of a recording track within tolerance.

According to the present invention, the correcting mechanism of the above-described optical pickup driving mechanism may have a corrective supporting point provided on the base, and a correcting arm which is rotatably supported at one end thereof by the corrective supporting point and rotatably connected at the other end thereof to the correcting point. With this arrangement, the structure of the correcting mechanism can be realized by a simple correcting arm. Thus, the production is facilitated, and the production cost can be reduced.

According to the present invention, the correcting mechanism of the above-described optical pickup driving mechanism may have a circular-arc cam provided on the base, and a follower member which is provided at the correcting point to move along the profile of the circular-arc cam. In this correcting mechanism, the number of movable members is small, and the cam profile is simple, i.e., a circular arc. Therefore, production is easy, and the production cost can be reduced.

According to the present invention, the correcting mechanism of the above-described optical pickup driving mechanism may have a corrective supporting point provided on the base, and a correcting disk which is supported so as to be rotatable about the corrective supporting point and which is rotatably connected to the correcting point at a point which is displaced relative to the center of the correcting disk. This correcting mechanism enables a gear mechanism to be used as the swing arm driving mechanism and allows a feed motor of the swing arm driving mechanism to be disposed in parallel to a spindle motor. In addition, the gear transmission mechanism allows a reduction of the installation space for the whole driving mechanism.

The above-described swing arm driving mechanism may have: a gear which rotates together with the correcting disk as one unit; a feed motor; and a gear transmission mechanism for transmitting rotation of an output shaft of is the feed motor to the correcting disk. This correcting mechanism enables the feed motor to be disposed in parallel to a spindle motor. In addition, the gear transmission mechanism allows a reduction of the installation space for the whole driving mechanism.

According to the present invention, the swing arm driving mechanism of the above-described optical pickup driving mechanism may have: a feed screw shaft having a threaded portion at a forward end thereof and a guide portion at a rear end thereof; a bearing for retaining the feed screw shaft in such a manner that the feed screw shaft is rotatable and tiltable in the axial direction; a driving rod having a nut which is in thread engagement with the feed screw shaft, the driving rod being rotatably supported at a distal end portion thereof by a drive supporting point on an intermediate portion of the swing arm; a feed motor; and a universal coupling for connecting an output shaft of the feed motor and the rear end of the feed screw shaft. The use of such a simple and common screw feed mechanism enables the production cost to be reduced.

According to the present invention, the optical pickup of the above-described optical pickup driving mechanism may comprise a lens driving unit and an optical system unit, the lens driving unit being fixed on an end of the swing arm which is opposite to the flat portion, the optical system unit being fixed on an intermediate portion of the swing arm. Because the optical system unit, which is relatively heavy, is mounted on an intermediate portion of the swing arm, the moment of inertia of the whole structure reduces, and the output of a motor for swingingly driving these members is minimized.

According to the present invention, the above-described optical pickup driving mechanism may further have an output terminal for a read signal which is provided on the optical system unit at a position closer to the swing supporting point. Accordingly, the length of a signal line connecting the output terminal and an amplifier is minimized, and it is possible to suppress degradation of the output signal and to reduce noise mixed in the signal.

The optical pickup driving mechanism according to the present invention may further have a biasing member for biasing the flat portion of the swing arm toward the swing supporting point so that the flat portion and the swing supporting point slidably contact each other at all times. Thus, the flat portion and the swing supporting point are kept in contact with each other at all times, and the axial motion of the swing arm is ensured.

In the optical pickup driving mechanism according to the present invention, the flat portion of the swing arm may be a slot which is elongate in the direction of the center axis of the swing arm. The swing supporting point is free-fit in the slot in such a manner that the swing supporting point is movable relative to the swing arm only in the center axis direction of the swing arm. Thus, it is possible to dispense with a biasing member for regulating a motion in a direction perpendicular to the axial direction.

The optical pickup driving mechanism according to the present invention may further have a distal end guide provided on the base, and a sliding support member which is provided on the swinging end portion of the swing arm and slidably supported and guided by the distal end guide. The guide mechanism for the distal end portion of the swing arm makes it possible to prevent oscillation or vibration of the distal end portion of the swing arm and hence possible to reduce CD recording signal read errors.

DETAILED DESCRIPTION OF THE PREFERRED EMBODIMENTS

Figure 1:
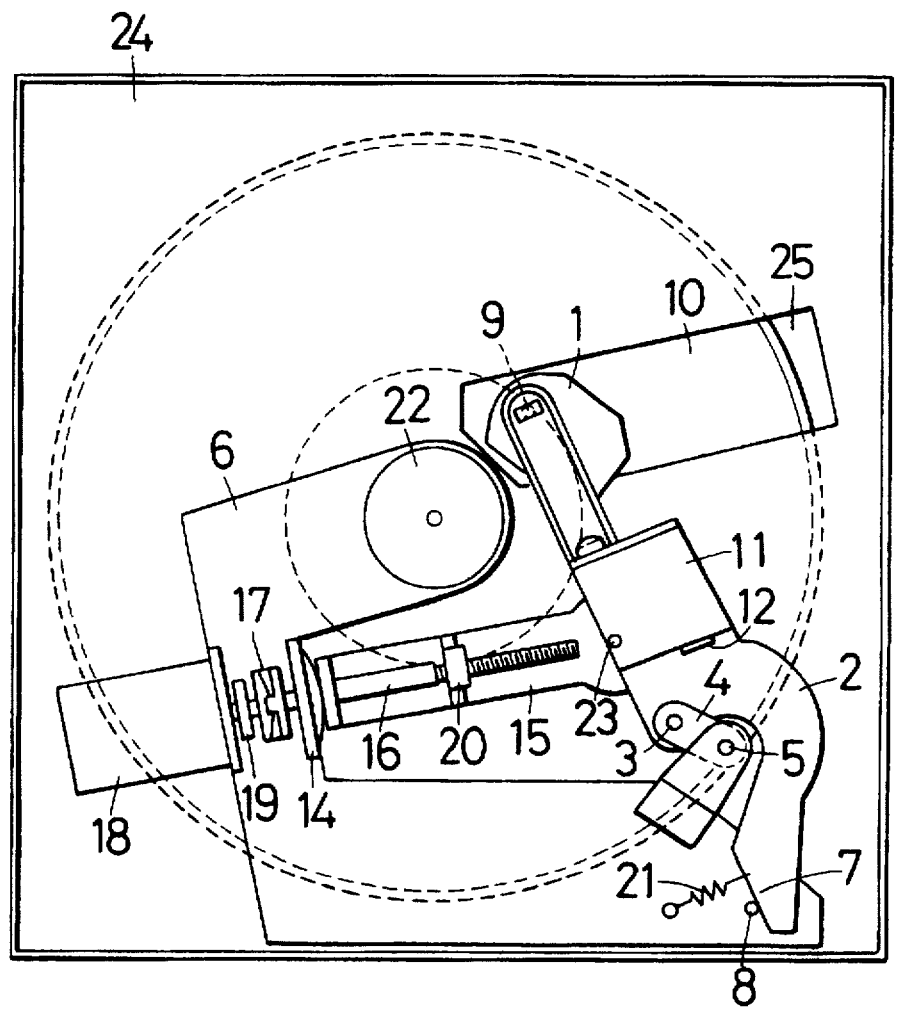
FIG. 1 shows an arrangement in which a driving mechanism for an optical pickup for optical disks according to the present invention is applied to a CD drive, as viewed from the reverse side.
Figure 2:
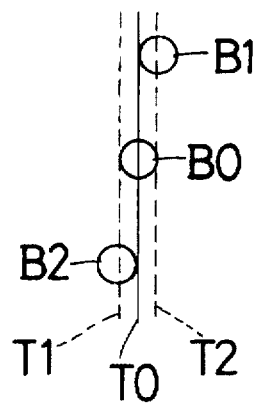
FIG. 2 illustrates the principle of the tracking error detection by the 3-beam system.
Figure 3:
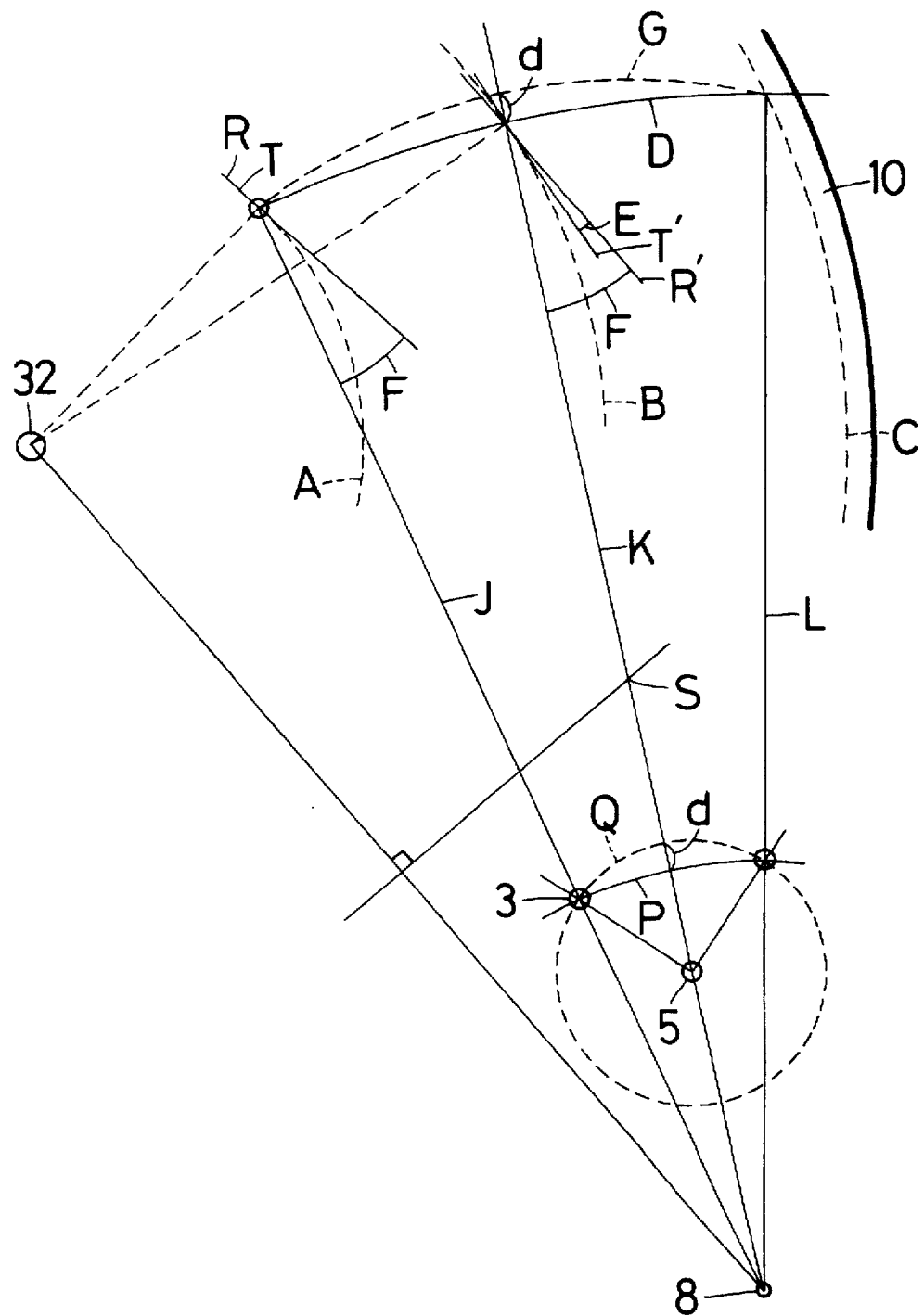
FIG. 3 illustrates the principle of the driving mechanism for an optical pickup for optical disks according to the present invention.

The present invention will be described below in detail with reference to the accompanying drawings. FIG. 1 shows an arrangement in which a driving mechanism for an optical pickup for optical disks according to the present invention is applied to a CD. FIG. 3 shows the principle of the present invention. A CD 10 is driven to rotate about a CD rotation center 32. From among recording tracks on the CD 10, an inner track A, an intermediate track B, and an outer track C are selected in order from the inner peripheral side and taken as typical recording tracks. A lens driving unit 1 is mounted on the swinging distal end of a swing arm 2. The lens driving unit 1 includes an objective lens 9. When the objective lens 9 lies directly above one of the recording tracks, the tangential direction of the recording track and the direction of the reference line of the lens driving unit 1 should be coincident with each other. Reference characters J, K and L denote the positions of the center axis of the swing arm 2 when the objective lens 9 lies directly above the inner track A, the intermediate track B, and the outer track C, respectively. It is assumed that the angle between the straight lines J and K and the angle between the straight lines K and L are equal to each other.

A locus D shows a circular arc which is traced by the center of the objective lens 9 when the objective lens 9 simply rotates about a swing supporting point 8. The locus D is equivalent to a locus in the case of a simple pivotal rotation mechanism in which the swing arm 2 is pivotally supported by the swing supporting point 8. In the case of such a simple pivotal rotation mechanism, a reference line R of the lens driving unit 1 and a tangent T to the inner track A can be made coincident with each other by setting a pickup offset angle F to an appropriate value at the inner track A. However, at the intermediate track B, an error angle E occurs between the reference line R' and a tangent T' to the intermediate track B.

Even in the simple pivotal rotation mechanism, it is possible to set the position of the swing supporting point 8, the length of the swing arm 2 and the pickup offset angle F such that the error angle is also zero at the outer track C. Assuming that the radius of the inner track A is 23.0 mm, the radius of the outer track C is 58.0 mm, and the distance between the swing supporting point 8 and the CD center 32 is 63.9 mm, the error angle is zero at the inner track A and the outer track C if the length of the swing arm 2 (the distance between the swing supporting point 8 and the center of the objective lens 9) is set at 73.0 mm, and the pickup offset angle is set at 33.0 degrees. The calculation for this can be readily executed by applying the cosine theorem to a triangle whose vertices are formed by the CD center 32, the swing supporting point 8, and the center of the objective lens 9. In this case, the error angle E at the intermediate portion of the circular arc is of the order of 7 degrees. With such an error angle, it is impossible to effect tracking error detection by the 3-beam system. In the 3-beam system, the error angle must be within about 0.2 degree.

Therefore, let us consider a locus G on which the error angle is always zero. On the locus G, the angle between a straight line extending from the center of the objective lens 9 to the CD center 32 and a straight line extending from the center of the objective lens 9 to the swing supporting point 8 is constant. Hence, the locus G is a circular arc which passes through the CD center 32 and the swing supporting point 8. On the locus D also, the error angle is zero at the intersections of the locus D with the inner and outer tracks A and C. Therefore, it is possible to conceive a locus G which has points in common with the locus D on the inner and outer tracks A and C. The center of the locus G lies on the bisector of the angle between the straight lines J and L, that is, on the straight line K, and also lies on the perpendicular bisector of the segment connecting the CD center 32 and the swing supporting point 8. Therefore, the center of the locus G is the intersection S of the straight line K and the perpendicular bisector.

According to the present invention, the system is arranged such that the center of the objective lens 9 moves along a locus determined by correcting the locus D such that the locus D approximates the locus G. Comparison of the loci D and G reveals that the two loci coincide with each other on the straight lines J and L, but on the straight line K the locus G projects radially outward from the locus D by a distance d. In other words, the locus D, which is a locus of the simple rotational motion, should be projected outwardly by the distance d on the straight line K so as to approach the locus G. For this purpose, a correcting arm 4 is used. The correcting arm 4 pivots about a corrective supporting point 5 on a base 6. The other end of the correcting arm 4 is rotatably supported at a correcting point 3 on the swing arm 2. The corrective supporting point 5 lies on the perpendicular bisector of the angle between the straight lines J and L, that is, on the straight line K. The correcting point 3 lies on the center axis of the swing arm 2.

Assuming that P denotes a locus traced by the correcting point 3 when it simply rotates from a position on the straight line J about the swing supporting point 8, and that Q denotes a locus traced by the correcting point 3 when the correcting arm 4 pivots, each dimension should be set such that the locus Q projects outwardly from the locus P by a distance d on the straight line K. The use of such a mechanism allows the center of the objective lens 9 to move along a locus extremely approximate to a locus which coincides with the locus D on the straight lines J and K and which outwardly projects from the locus D by the distance d on the straight line K, that is, the locus G. In actuality, the mechanism of the correcting arm 4 enables the error angle to be within 0.1 degree at all points in the swingable range of from the straight line J to the straight line L. Thus, the mechanism is satisfactorily applicable to the tracking error detection using the 3-beam system.

In particular, if the position of the corrective supporting point 5 is made coincident with the point S and further the correcting point 3 is made coincident with the center of the objective lens 9, the locus traced by the center of the objective lens 9 is the locus G itself. In this case, the error angle is completely zero. However, because the correcting point 3 coincides with the center of the objective lens 9, it is necessary to devise the design. For example, a pivot that forms the corrective supporting point 5 needs to be hollow. Accordingly, the production cost increases. Although in FIG. 3 the correcting point 3 lies on the center axis of the swing arm 2 and the corrective supporting point 5 is on the straight line K, it should be noted that in actual practice the positions of the correcting point 3 and corrective supporting point 5 may be off the respective straight lines as long as the error angle falls within the allowable range.

FIG. 1 shows a CD drive employing the optical pickup driving mechanism for optical disks according to the present invention as viewed from the reverse side with respect to the side for loading a CD 10. Various mechanisms of the CD drive are disposed in a box-shaped chassis 24. The chassis 24 is provided with a detection window 25. The CD 10 is loaded on the obverse side of the chassis 24 with its read surface facing the detection window 25. Thus, information recorded on the CD 10 is read by the optical pickup comprising a lens driving unit 1 and an optical system unit 11.

A spindle motor 22 for rotating the CD 10 and a base 6 are fixed on the chassis 24. A swing supporting point 8 is fixed on the base 6. The swing supporting point 8 is formed by a columnar pin. The swing supporting point 8 is slidably contacted by a flat portion 7 provided at an end of a swing arm 2. A biasing member 21 is provided between the swing arm 2 and the base 6 to press the flat portion 7 against the swing supporting point 8 at all times. The flat portion 7 is a plane which contains the center axis of the swing arm 2 and which is parallel to the center axis of the swing supporting point 8. The optical pickup is fixed on the swing arm 2. The lens driving unit 1 is mounted on the swinging distal end of the swing arm 2, and the optical system unit 11 is mounted on an intermediate portion of the swing arm 2. An output terminal 12 is provided on a side of the optical system unit 11 which is closer to the swing supporting point 8. A signal read from the CD 10 is output from the output terminal 12, and input to an amplifier mounted on the chassis 24 through a signal line (not shown).

In this embodiment, the optical system unit 11, which is relatively heavy, is mounted on an intermediate portion of the swing arm 2 which is relatively close to the swing supporting point 8. Therefore, the moment of inertia of the whole structure including the optical pickup and the swing arm 2 reduces, and the output of a motor for swingingly driving these members is minimized. Further, because the output terminal 12 is provided on the optical system unit 11 at a position closer to the swing supporting point 8, the length of a signal line connecting the output terminal 12 and the amplifier fixed on the chassis 24 is minimized, and it is possible to suppress degradation of the output signal and to reduce noise mixed in the signal.

A corrective supporting point 5 is fixed on the base 6 at an approximately central position in the swingable angular range of the center axis of the swing arm 2. The corrective supporting point 5 is formed by a columnar pin. A correcting point 3 is provided on the swing arm 2 at a position on the center axis of the swing arm 2 and closer to the distal end thereof than the corrective supporting point 5. One end of a correcting arm 4 is rotatably supported by the corrective supporting point 5, and the other end of the correcting arm 4 is rotatably supported at the correcting point 3. The distance between the supporting points at the two ends of the correcting arm 4 is shorter than the distance between the correcting point 3 and the swing supporting point 8. Therefore, the swing motion of the distal end of the swing arm 2 is not a simple rotational motion, but it traces a swing locus corrected by the correcting arm 4. More specifically, the distal end of the swing arm 2 traces a circular-arc shaped swing locus whose central portion projects radially outward.

Figure 4:
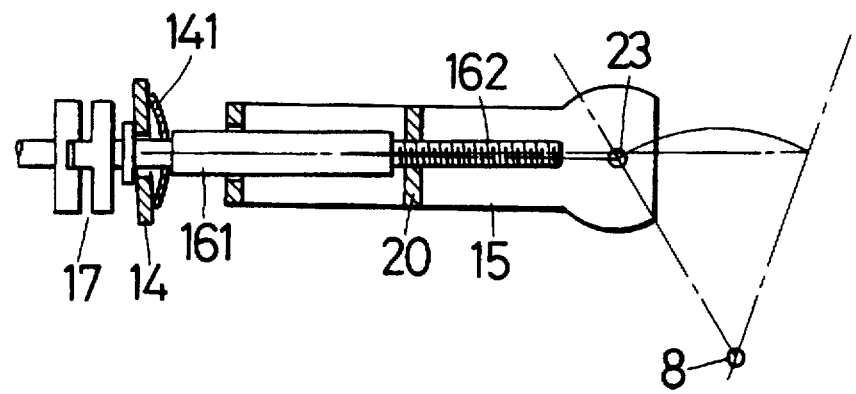
FIG. 4 shows a swing arm driving mechanism in an operative state.
Figure 5:
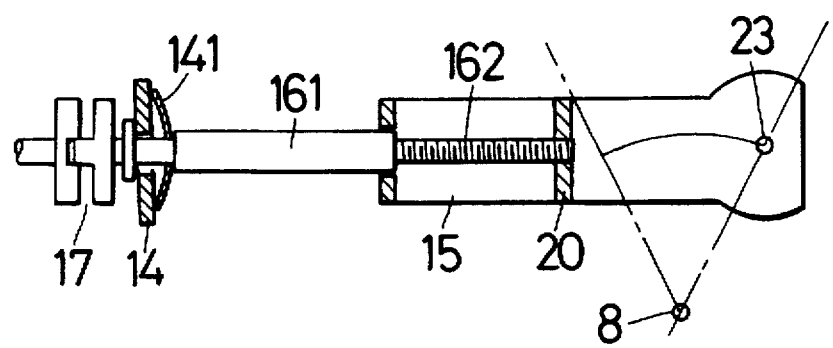
FIG. 5 shows the swing arm driving mechanism in another operative state.

A driving mechanism for swingingly driving the swing arm 2 comprises a feed motor 18, a feed screw shaft 16, a driving rod 15, etc. FIGS. 4 and 5 show the arrangement of the driving mechanism in detail. The feed screw shaft 16 is rotatably supported by a bearing 14. However, the feed screw shaft 16 is tiltable at a predetermined angle in the axial direction. The feed screw shaft 16 is biased in the axial direction by a spring 141 provided on the bearing 14. Therefore, there is no play in the axial direction, and the feed accuracy improves. An approximate half of the entire length of the feed screw shaft 16 which is closer to the feed motor 18 is formed as a guide portion 161. The guide portion 161 guides the driving rod 15 in the axial direction of the feed screw shaft 16. An approximate half of the entire length of the feed screw shaft 16 which is closer to the distal end portion thereof is a threaded portion 162. The threaded portion 162 has an external thread for swingingly feeding the swing arm 2. The threaded portion 162 is in thread engagement with a nut 20 which is fixed on the driving rod 15, thereby converting the rotational motion of the feed screw shaft 16 into a rectilinear motion of the driving rod 15.

The driving rod 15 and the swing arm 2 are rotatably supported by a drive supporting point 23 at the intermediate portion of the swing arm 2. An output shaft of the feed motor 18 is connected to the feed screw shaft 16 through a universal coupling 17. Even when the feed screw shaft 16 tilts with respect to the output shaft of the feed motor 18, rotation can be transmitted to the feed screw shaft 16 by a mechanism comprising the universal coupling 17 and the bearing 14. The mechanism enables smooth swinging feed drive despite approximately circular arc-shaped motion of the drive supporting point 23 as shown in FIGS. 4 and 5. A rotation angle sensor 19 is provided on the output shaft of the feed motor 18. The rotation angle sensor 19 generates a detection pulse per predetermined rotation angle of the feed motor 18. By using the detection pulse, even a small amount of swinging feed motion can be precisely controlled.

Figure 6:
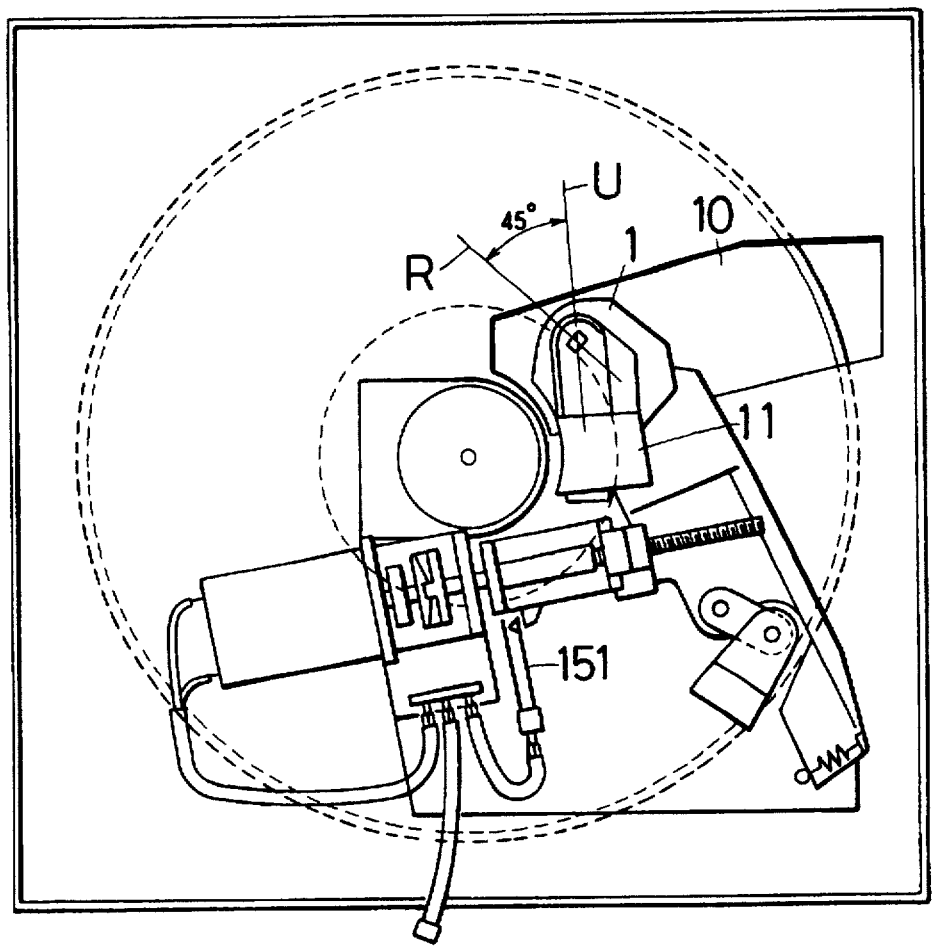
FIG. 6 shows another embodiment of the driving mechanism for an optical pickup for optical disks according to the present invention.

FIG. 6 shows another embodiment of the optical pickup driving mechanism for optical disks according to the present invention. In a typical commercially available optical pickup unit, the direction of the reference line of the lens driving unit 1 and the optical axis direction of the optical system unit 11 are fixed with an angle of 45 degrees therebetween. In the optical pickup driving mechanism for optical disks shown in FIG. 1, the optical axis direction of the optical system unit 11 and the center axis direction of the swing arm 2 are coincident with each other. Therefore, the angle between the direction of the reference line of the lens driving unit 1 and the optical axis direction of the optical system unit 11 is equal to the pickup offset angle. In general, the pickup offset angle is not necessarily 45 degrees. Accordingly, the optical pickup driving mechanism shown in FIG. 1 cannot use a commercially available unit having an inclination angle of 45 degrees.

Therefore, in the optical pickup driving mechanism shown in FIG. 6, the optical system unit 11 is disposed such that the optical axis direction U is inclined from the center axis direction of the swing arm 2, thereby allowing the direction of the reference line R of the lens driving unit 1 and the optical axis direction U of the optical system unit 11 to form an angle of 45 degrees. Thus, a typical commercially available unit of the 45 degree inclination type can be used as an optical pickup; this enables a reduction in the production cost. Further, the optical pickup driving mechanism shown in FIG. 6 is provided with a detecting switch 151 for detecting that the optical pickup has reached the inner limit position by coming into contact with an engagement projection provided on the driving rod 15.

Figure 7:
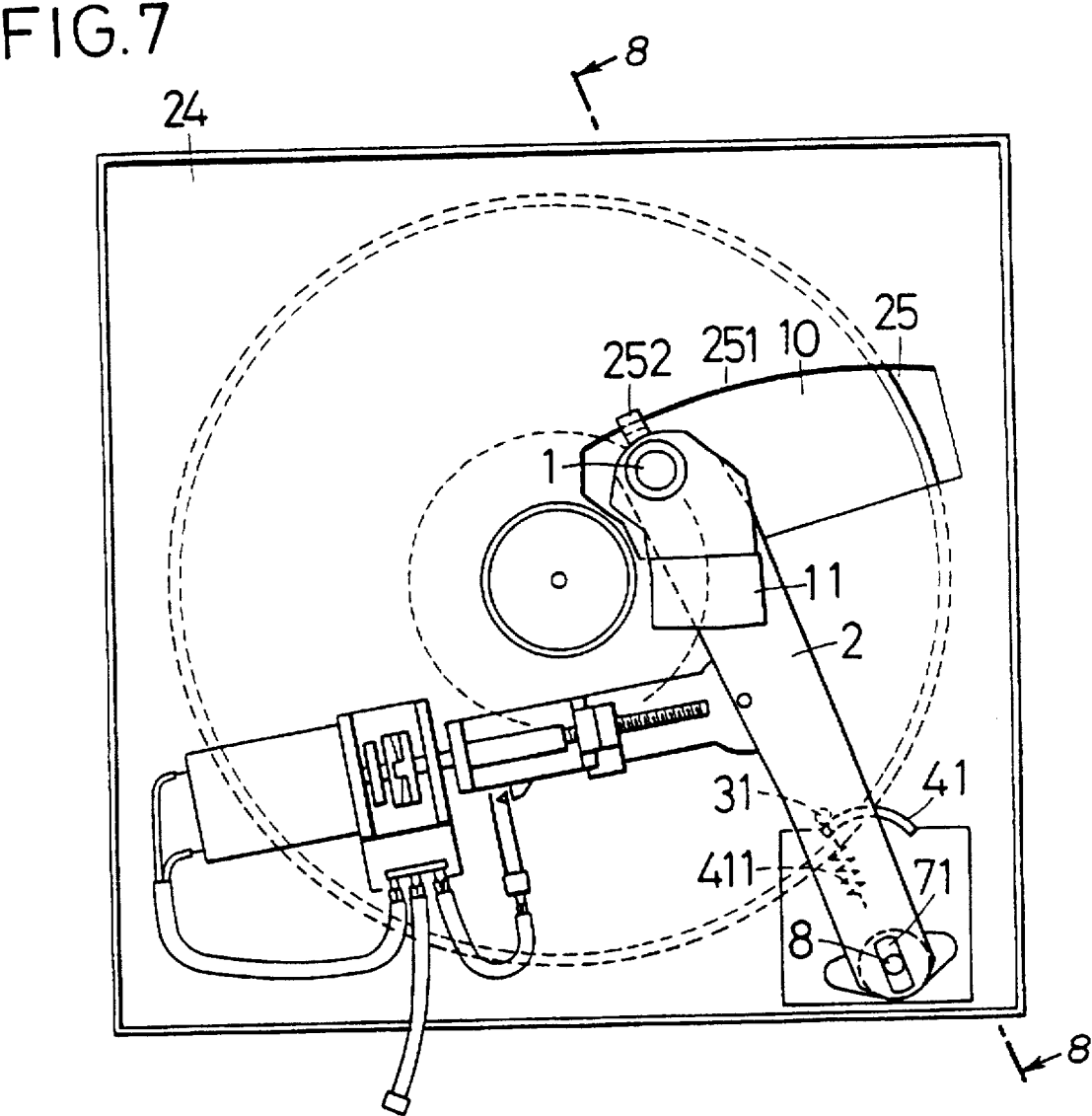
FIG. 7 shows still another embodiment of the driving mechanism for an optical pickup for optical disks according to the present invention.

FIG. 7 shows still another embodiment of the optical pickup driving mechanism for optical disks according to the present invention. The swing arm 2 is formed with a slot 71 which is elongate in the center axis direction of the swing arm 2. The slot 71 serves as a flat portion of the swing arm 2 which is provided at an end thereof closer to the swing supporting point 8. The width of the slot 71 is approximately equal to the diameter of the swing supporting point 8. Accordingly, the swing supporting point 8 is free-fit in the slot 71 such that the swing arm 2 and the swing supporting point 8 are movable relative to each other only in the center axis direction of the swing arm 2. Therefore, it is unnecessary to provide a biasing member for pressing the flat portion against the swing supporting point 8.

Figure 8:
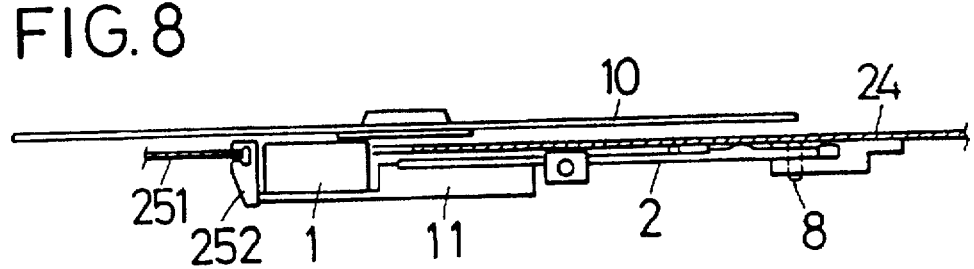
FIG. 8 is a sectional view taken along the line 8—8 in FIG. 7.

Further, a circular-arc cam 41 is provided on the chassis 24. The circular-arc cam 41 has a circular arc-shaped cam surface centered at a point which is equivalent to the corrective supporting point. A follower member 31 is provided on the center axis of the swing arm 2. The follower member 31 is equivalent to the correcting point. Further, a biasing member 411 is provided for pressing the follower member 31 against the circular-arc cam 41. The follower member 31 is a columnar pin. The follower member 31 performs a circular motion along the cam surface of the circular-arc cam 41, thereby effecting the same correcting motion as in the case of using the correcting arm 4. In the correcting mechanism that uses the circular-arc cam 41, the correcting arm 4 is not provided, and the number of movable members is small. In addition, the cam profile is simple, that is, a circular arc. Therefore, the production is easy, and the production cost can be reduced. The swing arm 2 is supported at an end thereof which is closer to the swing supporting point 8 in a cantilever fashion. Therefore, the rigidity of the swing arm 2 is weak, and the swing arm 2, particularly, the distal end thereof is likely to oscillate or vibrate. To improve the shortcomings, a part of the chassis 24 which forms one edge of the detection window 25 that faces the distal end of the swing arm 2 is formed as a distal end guide 251, and a sliding support member 252 which is provided on the swinging distal end of the swing arm 2 is slidably supported and guided by the distal end guide 251. This guide mechanism makes it possible to prevent oscillation or vibration of the distal end portion of the swing arm 2 and hence possible to reduce CD recording signal read errors. FIG. 8 is a sectional view taken along the line X—X in FIG. 7.

Figure 9:
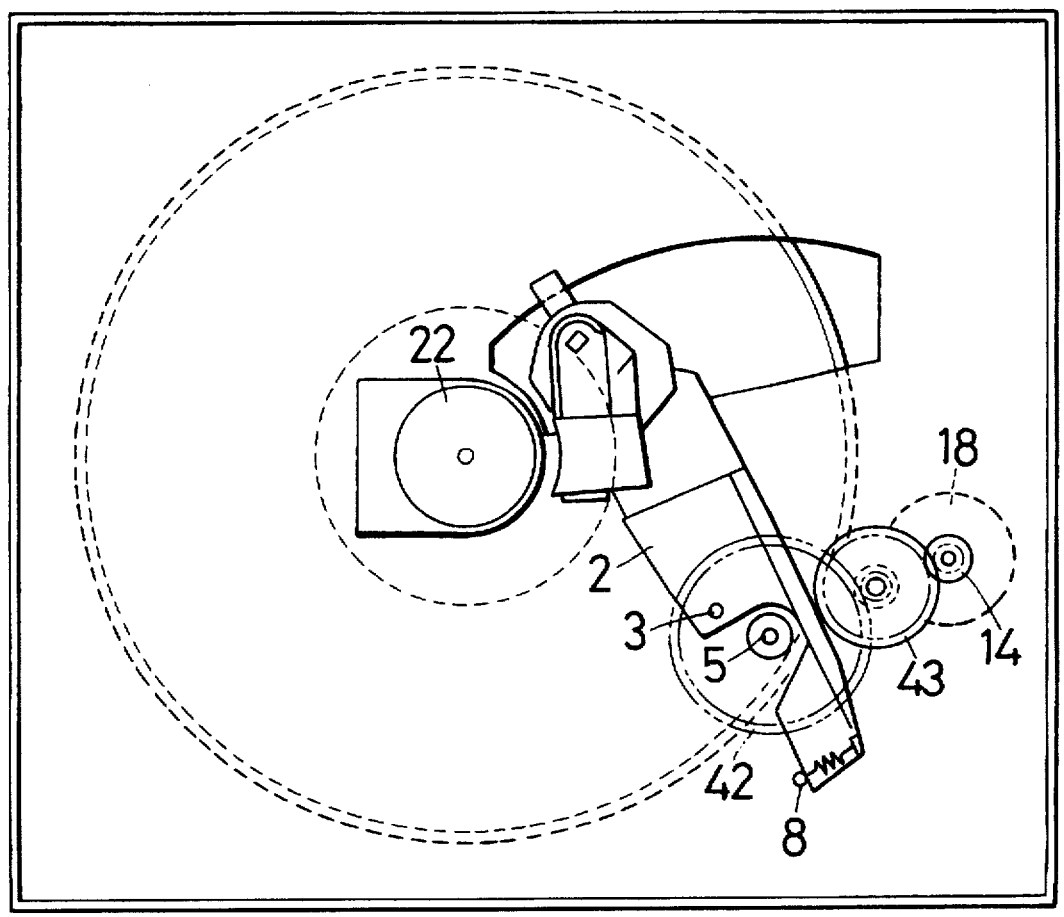
FIG. 9 shows a further embodiment of the driving mechanism for an optical pickup for optical disks according to the present invention.

FIG. 9 shows a further embodiment of the optical pickup driving mechanism for optical disks according to the present invention. A correcting disk 42 is rotatably supported at the center thereof by the corrective supporting point 5. Further, the correcting disk 42 is rotatably connected to the correcting point 3 on the swing arm 2 at a point which is displaced relative to the center of the correcting disk 42. The amount of displacement from the center of the correcting disk 42 to the correcting point 3 is equivalent to the distance between the two supporting points of the correcting arm 4 in the embodiment shown in FIG. 1.

The correcting disk 42 has a gear which is integrally formed thereon. Thus, rotation of the feed motor 18 is transmitted to the correcting disk 42 through a gear 44 mounted on the output shaft of the feed motor 18 and an intermediate gear 43. By driving the correcting disk 42 to rotate, the swing arm 2 is swingingly driven through the correcting point 3. The correcting and driving mechanisms enable the feed motor 18 to be disposed in parallel to the spindle motor 22. In addition, the gear transmission mechanism allows a reduction of the installation space for the whole driving mechanism.

Examples of actual dimensions will be shown below. With the arrangement shown in FIG. 3 and the following dimensions, the error angle was within 0.1 degree at all points in the swingable range of from the straight line J to the straight line L, and thus the optical pickup driving mechanism for optical disks was satisfactorily applicable to the tracking error detection using the 3-beam system.

Radius of the inner track A: 23.0 mm
Radius of the outer track C: 58.0 mm
Distance between the swing supporting point 8 and the CD center 32: 63.9 mm
Distance between the swing supporting point 8 and the center of the objective lens 9 on the straight line J: 73.0 mm
Pickup offset angle: 33.0 degrees
Distance between the correcting point 3 and the center of the objective lens 9: 43.9 mm
Distance between the swing supporting point 8 and the corrective supporting point 5: 22.3 mm
Distance between the corrective supporting point 5 and the correcting point 3: 10.0 mm As has been described above, the optical pickup driving mechanism for optical disks according to the present invention is usable as a driving mechanism for an optical pickup for optical disks in the general sense that information is read therefrom by using light, that is, compact disks, magneto-optical disks, phase-change type optical disks, etc. The present invention is particularly suitable for use as a driving mechanism for an optical pickup for optical disks.

It is to be understood that the above-described embodiments are merely illustrations of the principles of the invention. Various modifications and changes may be made thereto by those skilled in the art which will embody the principles of the invention and fall within the spirit and scope thereof.

What is claimed is:

1. A driving mechanism for an optical pickup for optical disks, said driving mechanism comprising:

a swing supporting point provided on a base;

a swing arm which pivots about said swing supporting point and fixedly holds said optical pickup, said swing arm having a flat portion provided near an end portion thereof, said flat portion extending parallel to a center axis of said swing arm, said swing arm further having a correcting point provided at a predetermined position;

a correcting mechanism connected to said swing arm for causing said correcting point to move along a circular arc having a radius smaller than a distance from said correcting point to said swing supporting point; and a swing arm driving mechanism connected to said swing arm for swingingly driving said swing arm about said swing supporting point provided on said base.

2. An optical pickup driving mechanism as claimed in claim 1, wherein said correcting mechanism has a corrective supporting point provided on said base, and a correcting arm which is rotatably supported at one end thereof by said corrective supporting point and rotatably connected at the other end thereof to said correcting point.

3. An optical pickup driving mechanism as claimed in claim 1, wherein said correcting mechanism has a circular-arc cam provided on said base, and a follower member which is provided at said correcting point to move along a profile or said circular-arc cam.

4. An optical pickup driving mechanism as claimed in claim 1, wherein said correcting mechanism has a corrective supporting point provided on said base, and a correcting disk which is supported so as to be rotatable about said corrective supporting point and which is rotatably connected to said correcting point at a point which is displaced relative to a center of said correcting disk.

5. An optical pickup driving mechanism as claimed in claim 4, wherein said swing arm driving mechanism comprises:

a gear which rotates together with said correcting disk as one unit;

a feed motor; and a gear transmission mechanism for transmitting rotation of an output shaft of said feed motor to said correcting disk.

6. An optical pickup driving mechanism as claimed in claim 1, wherein said swing arm driving mechanism comprises:

a feed screw shaft having a threaded portion at a forward end thereof and a guide portion at a rear end thereof;

a bearing for retaining said feed screw shaft in such a manner that said feed screw shaft is rotatable and tiltable in an axial direction;

a driving rod having a nut which is in thread engagement with said feed screw shaft, said driving rod being rotatably supported at a distal end portion thereof by a drive supporting point on an intermediate portion of said swing arm;

a feed motor; and a universal coupling for connecting an output shaft of said feed motor and the rear end of said feed screw shaft.

7. An optical pickup driving mechanism as claimed in claim 1, wherein said optical pickup comprises a lens driving unit and an optical system unit, said lens driving unit being fixed on an end of said swing arm which is opposite to said flat portion, said optical which is opposite to said flat portion, said optical system unit being fixed on an intermediate portion of said swing arm.

8. An optical pickup driving mechanism as claimed in claim 7, wherein an output terminal for a read signal is provided on said optical system unit at a position closer to said swing supporting point.

9. An optical pickup driving mechanism as claimed in claim 1, further comprising a biasing member for biasing said flat portion of said swing arm toward said swing supporting point so that said flat portion and said swing supporting point slidably contact each other at all times.

10. An optical pickup driving mechanism as claimed in claim 1, wherein said flat portion of said swing arm is a slot which is elongate in a direction of the center axis of said swing arm, said swing support point being free-fit in said slot in such a manner that said swing supporting point is movable relative to said swing arm only in the center axis direction of said swing arm.

11. An optical pickup driving mechanism as claimed in claim 1, further comprising:

a distal end guide provided on said base; and a sliding support member which is provided on a swinging end portion of said swing arm and slidably supported and guided by said distal end guide.

* * * * *